(12) United States Patent
Talbot et al.

(10) Patent No.: US 7,484,349 B2
(45) Date of Patent: Feb. 3, 2009

(54) OPERATING AND STORAGE POSITIONS OF A SWATHER CONVEYOR

(75) Inventors: Francois R. Talbot, Winnipeg (CA); Daniel G. Cormier, Oak Bluff (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 469 days.

(21) Appl. No.: 11/234,391

(22) Filed: Sep. 26, 2005

(65) Prior Publication Data

US 2007/0068131 A1    Mar. 29, 2007

(51) Int. Cl.
*A01D 43/00* (2006.01)
*A01D 47/00* (2006.01)

(52) U.S. Cl. ..................................................... 56/192

(58) Field of Classification Search .................... 56/192, 56/375, 153, 181, 189, 366, 370, 376
See application file for complete search history.

(56) References Cited

U.S. PATENT DOCUMENTS 4,590,751 A * 5/1986 Stephenson .................. 56/192
4,910,951 A * 3/1990 Reilly et al. .................. 56/376
5,031,393 A    7/1991 Rostoucher
5,203,154 A * 4/1993 Lesher et al. ................. 56/366
5,351,468 A   10/1994 Pominville
6,145,289 A   11/2000 Welsch et al.
6,415,590 B1 * 7/2002 Lohrentz ...................... 56/192
6,679,038 B2   1/2004 Walch et al.
6,832,467 B2 * 12/2004 Franet et al. .................. 56/192
7,028,459 B2 * 4/2006 Lohrentz et al. .............. 56/192

* cited by examiner

*Primary Examiner*—Árpád Fábián-Kovács
(74) *Attorney, Agent, or Firm*—Adrian D. Battison; Ade & Company Inc.

(57) ABSTRACT

A self-propelled swather has a frame mounted on ground wheels with a header in front which discharges between the wheels. A swath conveyor belt is located underneath the frame and arranged to convey the cut crop across the frame to a first discharge side of the frame. A mounting assembly including a beam across the belt and a lift arm mounts the swath conveyor for movement between a raised storage position in which the belt is horizontal underneath the frame and a lowered operating position in which the belt is inclined forwardly and downwardly while at the same time causing the beam to twist to cause the inlet end of the belt to move forwardly further than the discharge end to a forwardly inclined position between the front wheels.

17 Claims, 7 Drawing Sheets

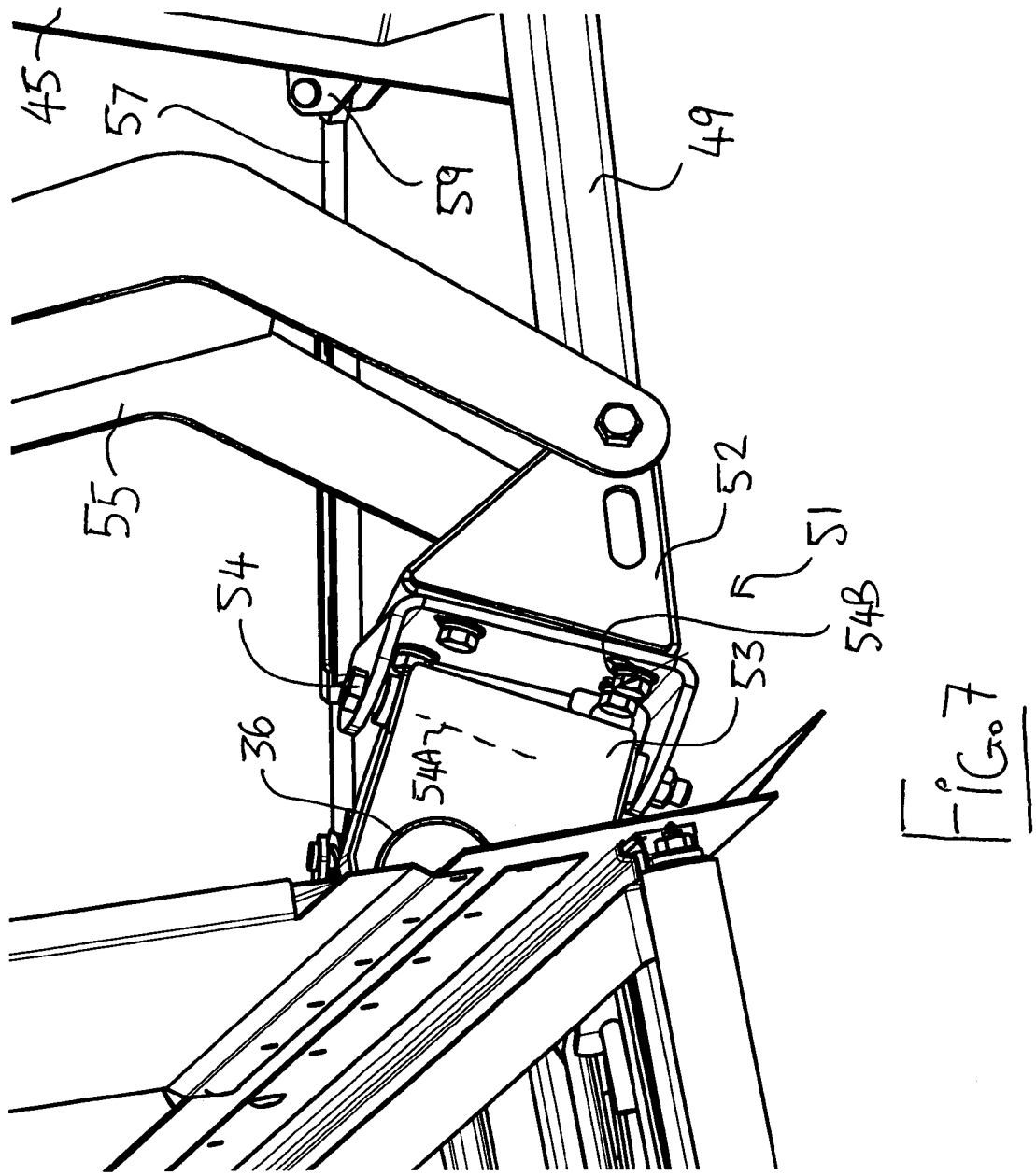

OPERATING AND STORAGE POSITIONS OF A SWATHER CONVEYOR

This invention relates to a swather otherwise known as a windrower and particularly to a conveyor arrangement which conveys the crop swath or windrow to one side of the frame for double windrowing. The term swather as used herein is synonymous with windrower and can include many different types of cutting systems such as sickle knife and disk cutters, many different types of crop converging systems including draper and auger and many different types of conditioning systems including nip rollers and flail rollers.

BACKGROUND OF THE INVENTION

It is well-known that self-propelled swathers include a tractor in the form of a tractor frame carried on a pair of widely spaced front driven ground wheels together with widely spaced rear castor wheels. At the front of the frame is mounted a header extending across the frame for cutting the standing crop with the header generally having components which convey the crop material inwardly to a discharge opening between the front wheels so that the crop material is discharged in a windrow or swath between the wheels of the tractor.

In some cases the tractor carries a set of conditioning rollers behind the discharge opening for the crop material to be crushed or otherwise conditioned from improved drying action.

It is becoming more popular to utilize a conveyor underneath the frame of the tractor which acts, when activated, to transport the windrow from a position underneath the frame to a position of one side of the frame so that the windrow can be combined with another window or more than one windrow where other windrows are arranged alongside one another to be picked up simultaneously either for collection in a forage harvesting system or for baling.

A number of different arrangements are known for this conveyor which is also commonly known as a "double windrow attachment" or "DWA".

In U.S. Pat. No. 5,031,393 (Rostoucher) issued Jul. 16, 1996; U.S. Pat. No. 5,351,468 (Pominville) issued Oct. 4, 1994; U.S. Pat. No. 6,145,289 (Welsch) issued Nov. 14, 2000 and U.S. Pat. No. 6,679,038 (Walch) issued Jan. 20, 2004 are provided designs of double windrow attachment for windrowers which allow movements generally upwardly and downwardly from a lowered operating position to a raised retracted position.

In U.S. Pat. No. 6,415,590 (Lohrentz) issued Jul. 9, 2002 is shown a self-propelled windrower where the conveyor has a fixed rear beam along a rear edge of the upper run of the belt and pivots about this fixed beam so that the front edge of the belt pivots upwardly and forwardly from a lowered operating position in which the belt is inclined forwardly and downwardly to a raised retracted position.

Another arrangement mounted on a self-propelled tractor is shown in drawings of a device manufactured by Assignee of the present application in which the conveyor does not pivot about a fixed axis but instead is mounted on links which allow the whole conveyor to move upwardly and forwardly from the lowered operating position to a raised position. This design is based upon a previous arrangement manufactured by Sharp's Welding and Mechanical Works in Stanfield, Ariz. The Sharp's device is also shown in photographs.

It is highly desirable that the conveyor be movable from an operating position in which the conveyor belt is inclined forwardly and downwardly and extends across the frame to a retracted position in which the conveyor is removed from the path of the crop material. However this movement is seriously constrained by the construction of tractor in that the conveyor in both positions must be clear of the wheels and must move to a properly retracted position and to a properly located operating position.

SUMMARY OF THE INVENTION

It is one object of the invention to provide an improved swather which includes a swath conveyer which is effectively moveable between a raised storage position and an operating position.

According to one aspect of the invention there is provided a swather comprising:

a tractor having a frame;

ground wheels for supporting the frame for movement across the ground including two front ground wheels spaced apart to define an open width underneath the tractor and between the front wheels and two rear ground wheels spaced apart to define an open width underneath the tractor and between the rear wheels;

a header for attachment across a front of the tractor for cutting a standing crop as the tractor moves over the ground;

the header having a converging system for converging the cut crop inwardly from ends of the header toward a discharge at a central area of the header;

the discharge of the header being arranged between the front wheels such that crop discharged from the header passes through the open width between the front wheels to be discharged onto the ground in a swath as the tractor moves forwardly and the standing crop is cut;

and a swath conveyor located underneath the frame and arranged to receive cut crop from the discharge and for conveying the cut crop across the frame to a first discharge side of the frame for discharge to an associated first side of the tractor;

the swath conveyor comprising an endless belt mounted on guide rollers including a first guide roller on the first side of the frame and a second guide roller on a second side of the frame opposite the first side such that crop falling on an upper run of the belt is carried by that upper run transversely of the frame from a position rearward of the discharge toward the first guide roller to said one side of the frame;

a mounting assembly mounting the swath conveyor for movement relative to the frame between:

a raised storage position in which the upper run and the guide rollers therefor are generally horizontal underneath the frame;

and a lowered operating position in which the upper run of the belt is inclined by the first and second guide rollers from an upper/rear edge forwardly and downwardly to a lower/front edge such that the crop from the discharge lands on the upper run between the upper/rear edge and the lower/front edge to be carried transversely to said one side of the frame;

the mounting assembly being arranged such that the lower/front edge of the upper run at the second guide roller is, as the swath conveyer is moved from the raised position to the lowered position, moved forwardly by the mounting assembly relative to the lower/front edge of the upper run at the first guide roller.

The discharge of the header is in most cases provided by the conditioner rollers behind the converging system and the crop is transferred from the conditioner rolls to the conveyor. However the use of conditioner rolls or some other form of conditioner is not essential and in this situation the discharge may be formed by some other element which ensures transfer to the conveyor.

Preferably the mounting assembly is arranged such that both the lower/front edge of the upper run at the second guide roller and the lower/front edge of the upper run at the first guide roller are moved forwardly as the swath conveyer is moved from the raised position to the lowered position.

Preferably the mounting assembly is arranged such that the lower/front edge of the upper run at the second guide roller is moved in the lowered position to a position between the front wheels.

Preferably the mounting assembly is adjustable such that the amount of forward movement of the lower/front edge of the upper run at the second guide roller is adjustable.

Preferably the mounting assembly is adjustable between two selectable arrangements such that the amount of forward movement of the lower/front edge of the upper run at the second guide roller is adjustable between two separate positions.

Preferably the mounting assembly comprises a transverse rear beam carried on a linkage by which the beam is raised upwardly and rearwardly from the lowered position to the raised position while the beam is rotated about an axis longitudinal of the beam.

Preferably the linkage includes a lift arm mounted on the frame and a pivot coupling at a forward end of the lift arm allowing pivotal movement of the beam relative to the forward end of the lift arm to allow the forward movement of the lower/front edge of the upper run at the second guide roller.

Preferably there is provided a steering link connected to the beam for causing the pivotal movement of the beam.

According to a second aspect of the invention there is provided a swather comprising:

a tractor having a frame;

ground wheels for supporting the frame for movement across the ground including two front ground wheels spaced apart to define an open width underneath the tractor and between the front wheels and two rear ground wheels spaced apart to define an open width underneath the tractor and between the rear wheels;

a header for attachment across a front of the tractor for cutting a standing crop as the tractor moves over the ground;

the header having a converging system for converging the cut crop inwardly from ends of the header toward a discharge at a central area of the header;

the discharge of the header being arranged between the front wheels such that crop discharged from the header passes through the open width between the front wheels to be discharged onto the ground in a swath as the tractor moves forwardly and the standing crop is cut;

and a swath conveyor located underneath the frame and arranged to receive cut crop from the discharge and for conveying the cut crop across the frame to a first discharge side of the frame for discharge to an associated first side of the tractor;

the swath conveyor comprising an endless belt mounted on guide rollers including a first guide roller on the first side of the frame and a second guide roller on a second side of the frame opposite the first side such that crop falling on an upper run of the belt is carried by that upper run transversely of the frame from a position rearward of the discharge toward the first guide roller to said one side of the frame;

a mounting assembly mounting the swath conveyor for movement relative to the frame between:

a raised storage position in which the upper run and the guide rollers therefor are generally horizontal underneath the frame;

and a lowered operating position in which the upper run of the belt is inclined by the first and second guide rollers from an upper/rear edge forwardly and downwardly to a lower/front edge such that the crop from the discharge lands on the upper run between the upper/rear edge and the lower/front edge to be carried transversely to said one side of the frame;

the mounting assembly being arranged such that both the lower/front edge of the upper run at the second guide roller and the lower/front edge of the upper run at the first guide roller are moved forwardly as the swath conveyer is moved from the raised position to the lowered position.

According to a third aspect of the invention there is provided a swather comprising:

a tractor having a frame;

ground wheels for supporting the frame for movement across the ground including two front ground wheels spaced apart to define an open width underneath the tractor and between the front wheels and two rear ground wheels spaced apart to define an open width underneath the tractor and between the rear wheels;

a header for attachment across a front of the tractor for cutting a standing crop as the tractor moves over the ground;

the header having a converging system for converging the cut crop inwardly from ends of the header toward a discharge at a central area of the header;

the discharge of the header being arranged between the front wheels such that crop discharged from the header passes through the open width between the front wheels to be discharged onto the ground in a swath as the tractor moves forwardly and the standing crop is cut;

and a swath conveyor located underneath the frame and arranged to receive cut crop from the discharge and for conveying the cut crop across the frame to a first discharge side of the frame for discharge to an associated first side of the tractor;

the swath conveyor comprising an endless belt mounted on guide rollers including a first guide roller on the first side of the frame and a second guide roller on a second side of the frame opposite the first side such that crop falling on an upper run of the belt is carried by that upper run transversely of the frame from a position rearward of the discharge toward the first guide roller to said one side of the frame;

a mounting assembly mounting the swath conveyor for movement relative to the frame between:

a raised storage position in which the upper run and the guide rollers therefor are generally horizontal underneath the frame;

and a lowered operating position in which the upper run of the belt is inclined by the first and second guide rollers from an upper/rear edge forwardly and downwardly to a lower/front edge such that the crop from the discharge lands on the upper run between the upper/rear edge and the lower/front edge to be carried transversely to said one side of the frame;

the mounting assembly comprises a transverse rear beam carried on a linkage by which the beam is raised upwardly and rearwardly from the lowered position to the raised position while the beam is rotated about an axis longitudinal of the beam;

and wherein the linkage includes a lift arm mounted on the frame and a pivot coupling at a forward end of the lift arm allowing pivotal movement of the beam relative to the forward end of the lift arm to allow the forward movement of the lower/front edge of the upper run at the second guide roller.

BRIEF DESCRIPTION OF THE DRAWINGS

One embodiment of the invention will now be described in conjunction with the accompanying drawings in which:

FIG. 7 is an isometric view showing the elements of FIG. 5 but shown from the opposite side.

In the drawings like characters of reference indicate corresponding parts in the different figures.

DETAILED DESCRIPTION

Figure 1:
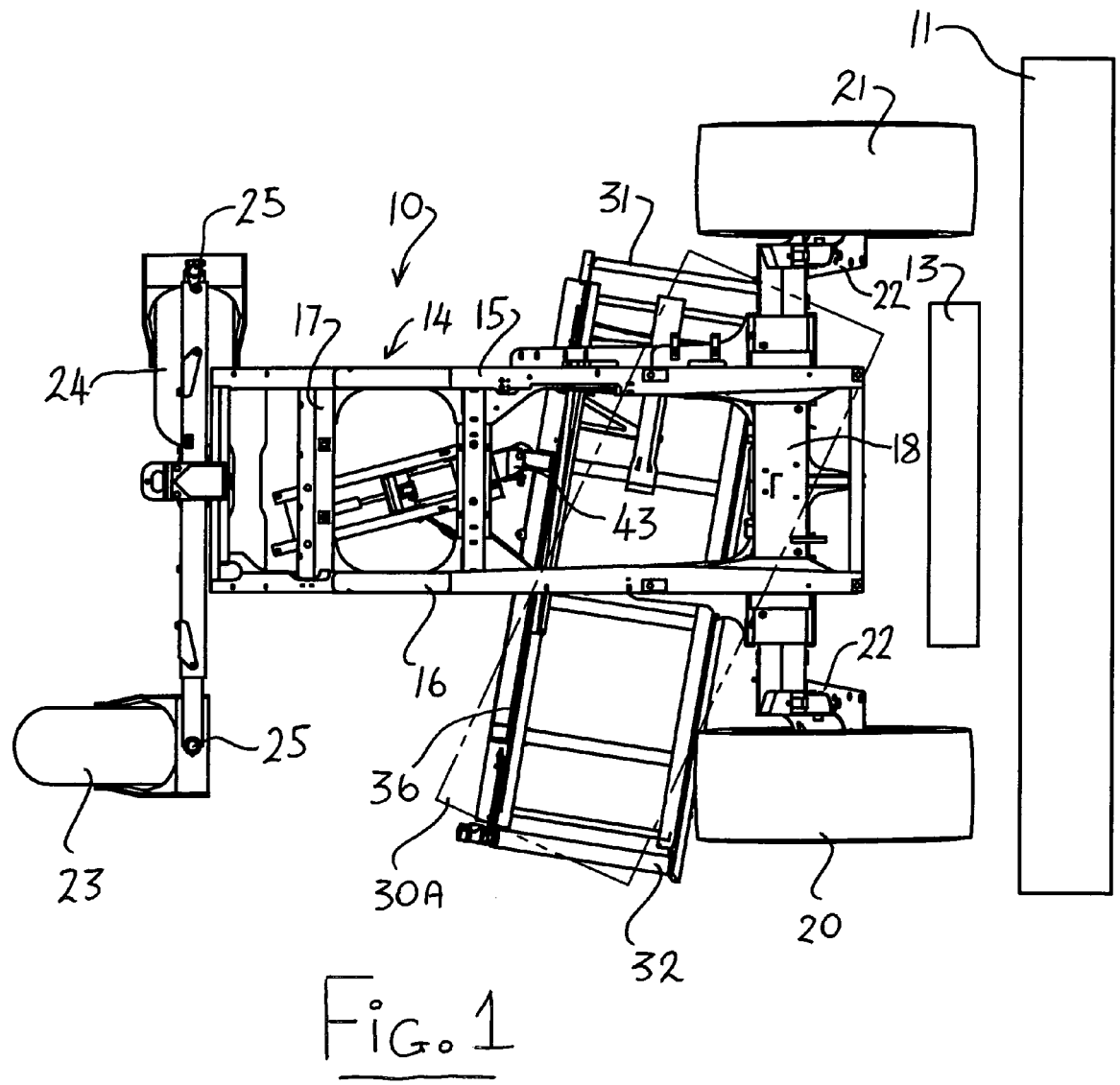
FIG. 1 is a top plan view partly in phantom showing a self-propelled windrower according to the present invention including a double windrow attachment in the form of a conveyor where the conveyor is shown in the lowered operating position. A second lowered operating position is shown also in phantom.

In the Figures is shown a swather or windrower which comprises a tractor 10, a header 11 and a crop conditioner 13. The header and crop conditioner are shown only schematically since these are well known to one skilled in the art and various different arrangements, locations and type can be provided. In most cases a conditioner is used in arrangements where a double windrow attachment is required but the conditioner is not essential provided the crop is transferred by some construction from the discharge to the belt described hereinafter.

The tractor 10 is also of a conventional nature and many different arrangements are well known to one skilled in the art. Basically a tractor of this type includes a frame 14 defined by a pair of longitudinally extending parallel rails 15 and 16 connected by suitable cross members 17 together with a front axle 18 and a rear axle 19. The front axle carries a pair of driven wheels 20 and 21 which are generally driven by hydraulic motors (not shown) supplied with hydraulic fluid under pressure from pumps (not shown) driven by a engine (also not shown) mounted on the frame. The rear axle carries a pair of castor wheels 23 and 24. Steering is effected by controlling the differential in speed between the wheels 20 and 21 as driven by the motors. The castor wheels are mounted on castor pins 25 carried on the axle and so the castor wheels can rotate fully around the castor pins and thus require significant amount of space around the outer ends of the rear axle 19 including an area underneath the frame.

The frame is supported at a height well above the ground so as to provide crop clearance. The header 11 is mounted on front arms of the frame which are again not shown as these can vary in accordance well the requirements of one skilled in the art.

The header is of the type which cuts standing crop as the tractor moves across the field and converges the cut crop into a discharge opening between the front wheels 20 and 21. If a conditioner is provided, the crop material from the discharge of the header passes through the conditioner and is discharged rearwardly from the conditioner between the front wheels so that the crop material can be deposited as a windrow underneath the tractor and between the wheels.

In some cases it is desirable to provide a crop conveyor which acts as a double windrow attachment. Such devices are generally known and comprise a conveyor in the form of a belt carried on end guide rollers so that the run of the belt is presented underneath the tractor to receive the crop material from the conditioner. The belt conveyor carries the crop material outwardly to one side beyond the wheels so that the crop material in the windrow can be deposited outside the width of the tractor along one side rather then between the wheels.

Figure 5:
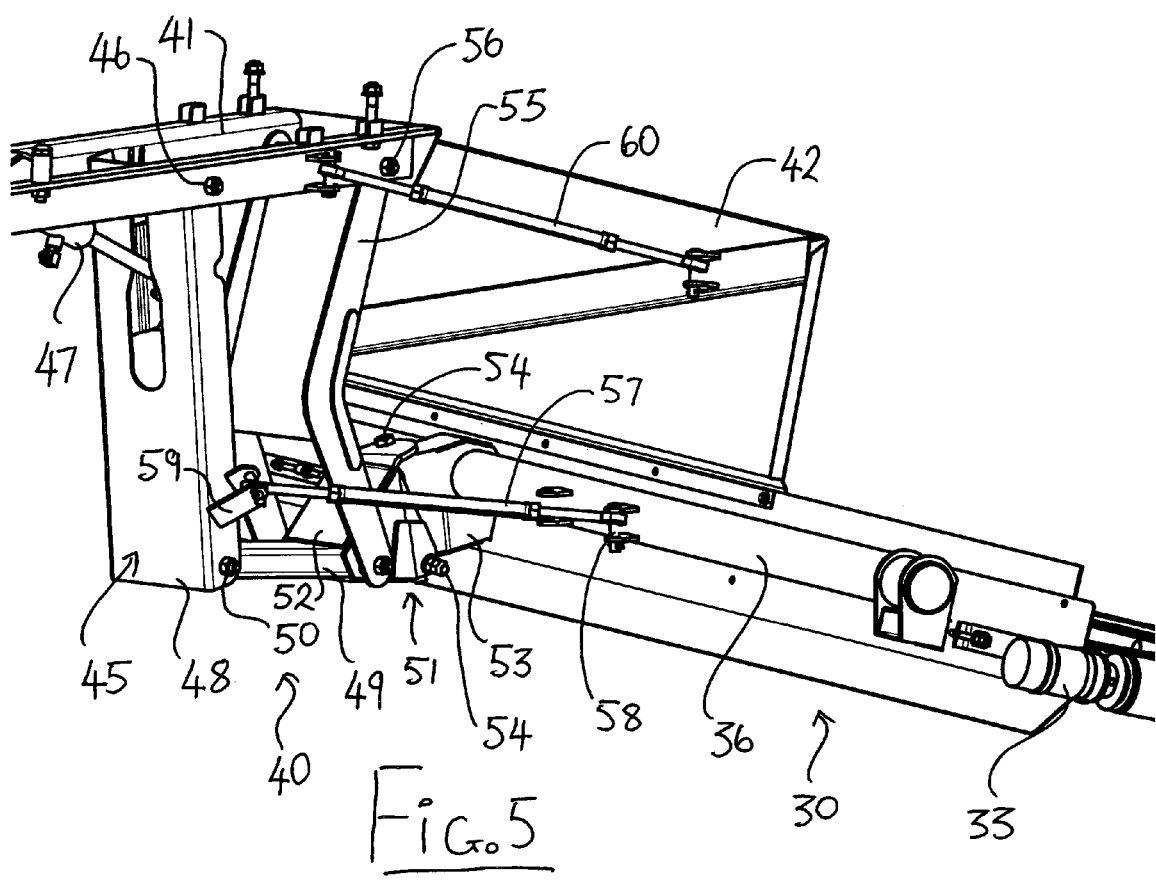
FIG. 5 is an isometric view of the conveyor of FIG. 4 again showing the conveyor in the lowered operating position.

Thus in the present arrangement, the crop conveyor is generally indicated at 30 which includes a first guide roller 32 on one side of the frame and a second guide roller 31 on the opposite side of the frame. The roller 32 is driven by a motor 33 so as to carry an endless belt which is wrapped around the rollers to define an upper run 34 of the belt which extends across the frame for transporting the crop material. The roller 31 is mounted just behind the discharge so as to collect the crop material at the side of the discharge and the roller 32 is located outwardly beyond the wheel 20. The rollers 31 and 32 are mounted on suitable support frames including a front rail 35 and a rear rail 36 together with a series of cross members 37. The rear rail 36 as best shown in FIG. 5 is in the form of a main tubular beam which extends across the rear and provides support for the remainder of the conveyor which extends forwardly therefrom in cantilever manner so that the cross members 37 are carried on the beam 36 which in turn supports the front rail 35 and the guide rollers 31 and 32.

The crop conveyor is carried on a mounting assembly generally indicated at 40 which is attached between a support member 41 of the frame and the beam 36.

Figure 2:
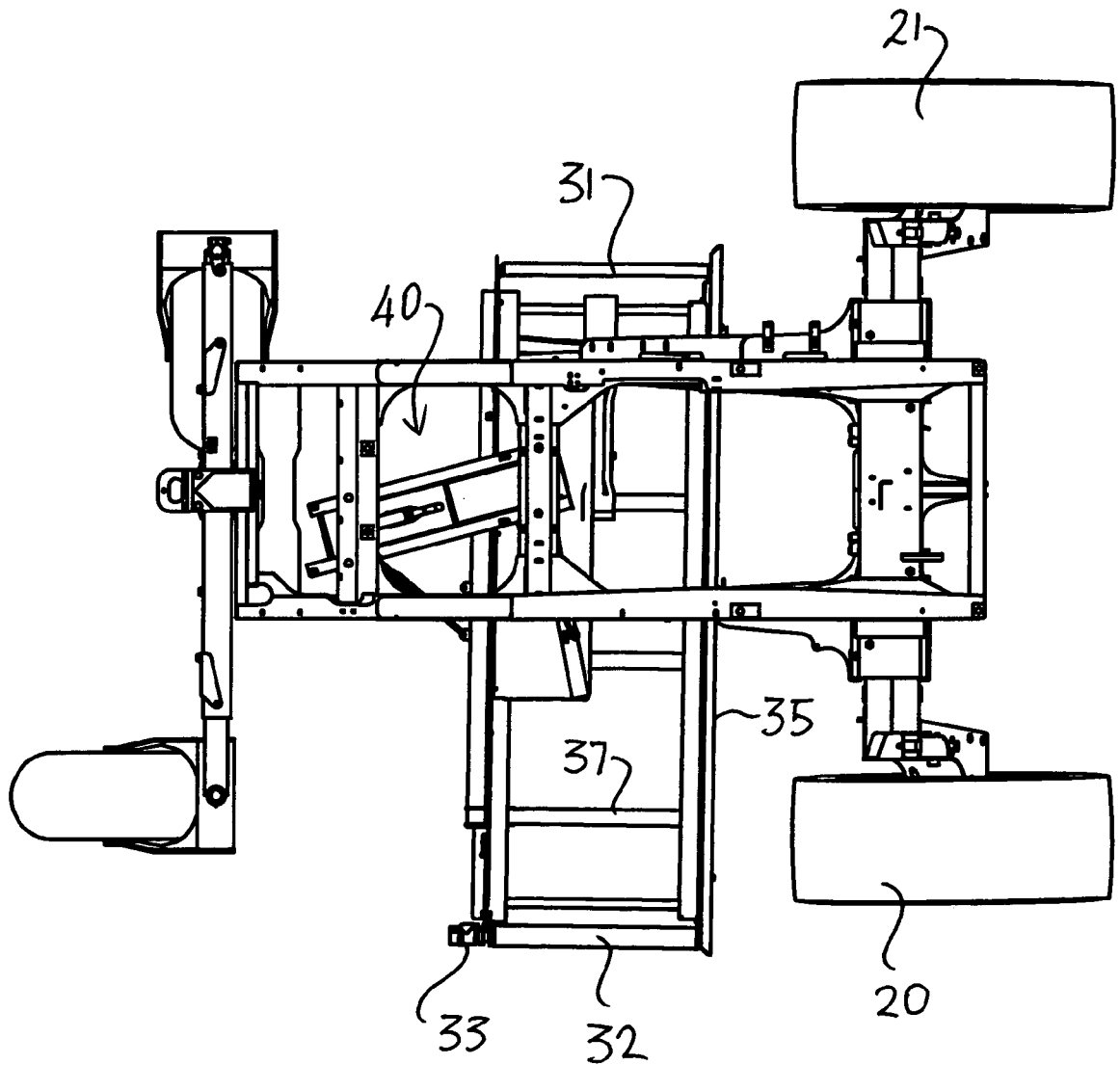
FIG. 2 is a top plan view of the same components as FIG. 1 showing the conveyor in the raised retracted position.
Figure 3:
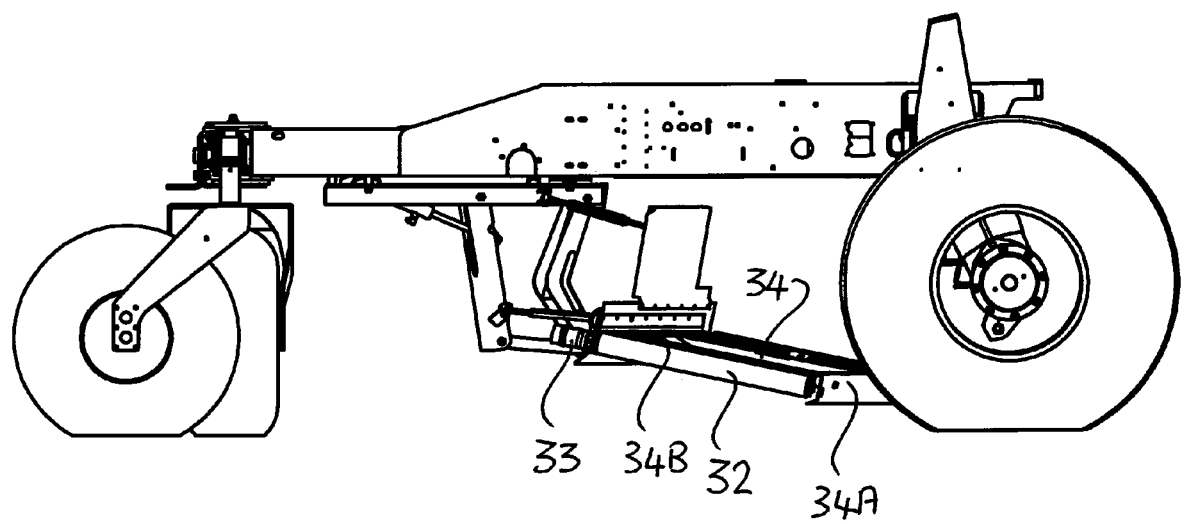
FIG. 3 is a side elevational view of some components of the windrower of FIGS. 1 and 2 with other components removed for convenience of illustration and showing the conveyor in the lowered operating position.
Figure 4:
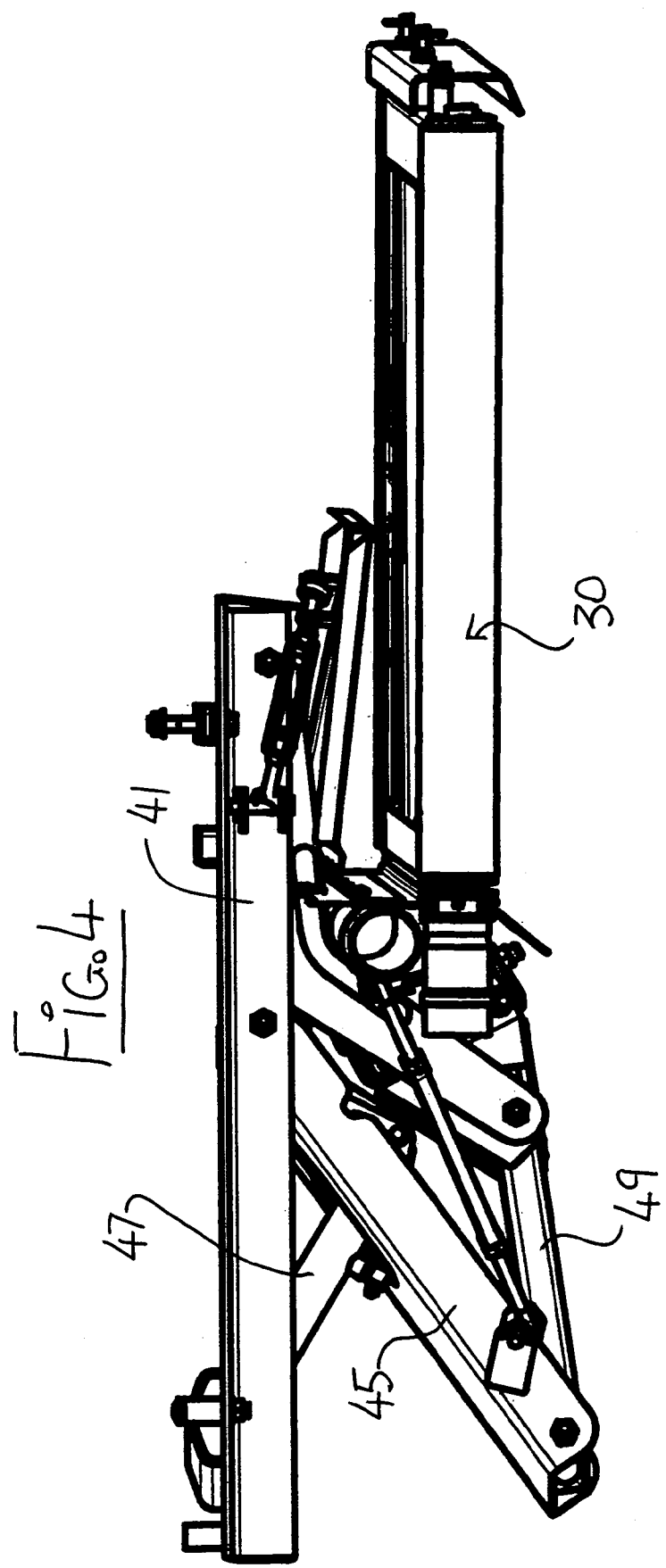
FIG. 4 is a similar side elevational view to that of FIG. 3 but showing only the conveyor itself in the raised storage position.
Figure 6:
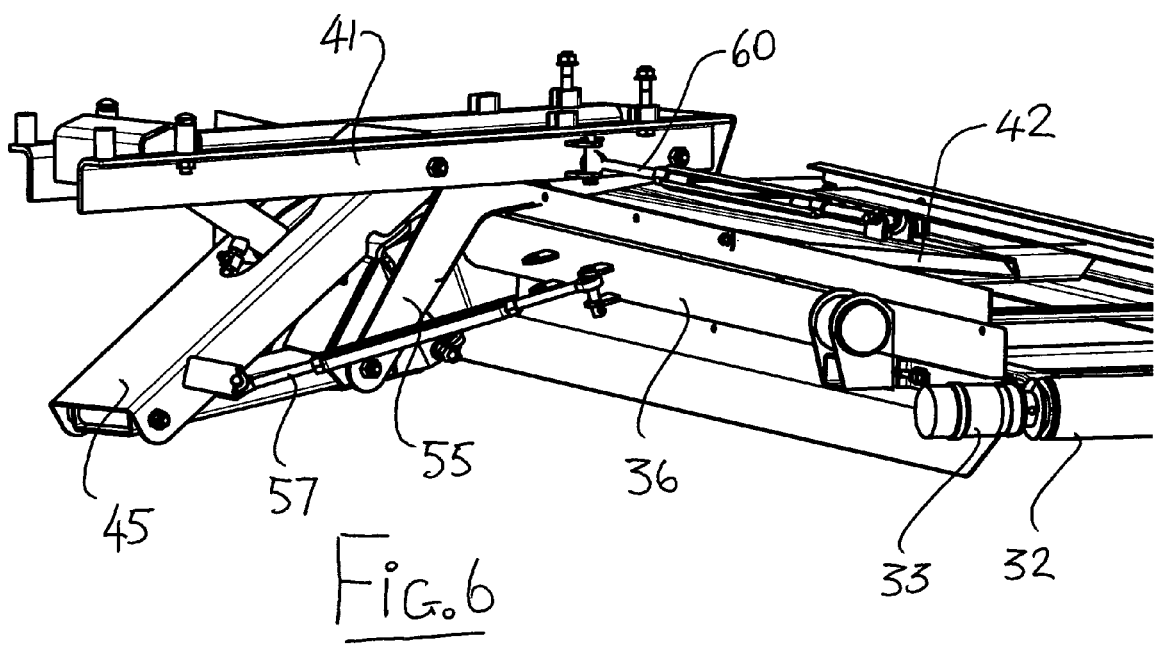
FIG. 6 is an isometric view showing the elements of FIG. 5 but shown in the raised retracted position.

In general the mounting arrangement 40 is arranged to move the conveyor from a raised retracted position as shown in FIGS. 2, 4 and 6 and a lowered operating position as shown in FIGS. 1, 3, 5 and 7. By comparing the positions shown in FIGS. 1 and 2, it will be noted that the raised retracted position supports the beam 36 so that is extends substantially horizontally across the frame at a rearward retracted position. The beam 36 as best shown in FIG. 6 is raised up immediately under the frame support member 41 and the beam is twisted so as to raise the conveyor and particularly the front edge of the conveyor and the front edge of the upper run of the belt to a position just underneath the frame. Thus the conveyor is raised to a position which is as high as possible under the frame and is clear of the normal path of the crop material which is discharged between the wheels and underneath the frame so that in the raised retracted position the crop material can continue on its normal path between the wheels under the frame to be laid as a windrow behind the tractor.

In the forward operating position shown in FIG. 1, the beam 36 is moved forwardly but at the same time the beam is twisted in two directions. In the first direction, the beam is twisted about its axis so as to lower the front edge of the conveyor so that the conveyor is inclined upwardly and rearwardly as best shown in FIG. 3. Thus in FIG. 3 the front edge of the belt is indicated at 34A which is below the rear edge of the belt indicated at 34B. The belt is thus inclined upwardly and rearwardly so the crop material can be deposited onto the belt.

In addition the beam 36 is rotated about a vertical mounting pivot 43 so that the second guide roller 31 and the associated end of the belt is moved forwardly relative to the first guide roller 32. Thus the conveyor twists so that the end of the belt at the second guide roller 31 is moved forwardly to move it to a position between the wheels and closer to the conditioner rolls.

Yet further the mounting 40 moves the whole of the beam 36 forwardly so the both ends of the front edge of the belt are moved forwardly. This moves the first guide roller 32 to a position just behind the wheel 20, as close as possible to the wheel 20 without causing interference. At the same time the second guide roller 31 and the associated end of the belt is moved further forward into a position between the wheels 20 and 21 that is inwardly of the wheel 21. In this way the front edge of the belt at the second guide roller 31 is located forwardly of the rear edge of the wheel 21 and into the area under the axle so as to better receive the crop material from the discharge at the conditioner 13.

Thus the crop is turned at an angle in the order of seventy degrees across the tractor to the discharge at the side of the tractor, that is the conveyor is arranged at an angle of 20 degrees to a line transverse to the tractor. To ensure that crop does not fall over the rear edge of the conveyor belt, a back plate 42 is provided fixed to the rear edge of the conveyor at the beam 36 and then standing upwardly therefrom. The plate is arranged so that it is directed behind the discharge so that crop material discharging at the upper extreme of the discharge engages onto the plate, drops onto the conveyor and is conveyed at the diagonal angle to the discharge of the conveyor.

The mounting as described hereinafter also is arranged to provide two set positions of the conveyor. The first position is shown in full line and the second position is shown in phantom as indicated at 30A. In this position, the angle of twist of the beam about a generally upright axis is increased so that the edge of the conveyor belt at the roller 31 is moved yet further forward and the edge of the conveyor at the roller 32 is moved rearwardly. This yet further increases the angle of inclination of the conveyor across the tractor up to an angle of the order of sixty degrees, or thirty degrees to a transverse line. This moves the front edge of the conveyor at the end defined by the roller 31 yet further forward behind the discharge of the header and this position is particularly useful for different arrangements of header where the discharge is moved forwardly to ensure that crop material does not fall between the discharge and the forward edge of the conveyor.

The mounting 40 as best shown in FIGS. 5 and 7 comprises a lift arm 45 mounted on a pivot 46 attached to the support bracket 41 carried on the frame. The support bracket is generally horizontal and defined by a channel member with the pin 46 extending across the channel member. The lift arm 45 is also defined by a channel member extending across the pin so that it pivots about the pin and provides mechanical support. The lift arm is raised and lowered by a cylinder 47. In an extended position of the cylinder, the lift arm 45 is moved downwardly so that lower end 48 of the lift arm is below the pivot pin 46. The lift arm carries a support arm 49 which projects forwardly from the lower end 48 and is carried on a pivot pin 50. At the forward end of the support arm is provided a bracket 51 which attaches to the beam 36. The bracket 51 includes a first portion 52 attached to the arm 49 and the second pivot portion 53 which can pivot relative to the first portion about a pivot pin 54. This pivot pin allows the pivot portion 53 and the beam 36 to which it is attached to pivot side to side about a generally upright axis 54A defined by the pin 54.

A guide arm 55 extends from the forward end of the support arm 49 up to the bracket 46 and is attached thereto by a pin 56. The guide arm 55 thus controls the angle of the support arm 49 relative to the horizontal as the lift arm 45 pivots forwardly and rearwardly.

Thus, as can be seen by comparing FIGS. 4 and 5, when the lift arm 45 is pivoted, by the retraction of the cylinder 47 upwardly and rearwardly, this acts to raise the support arm 49 and also to pivot the support arm and the beam carried thereby in a counter clockwise direction. Thus in the extended position shown in FIG. 5 the arm 49 extends forwardly and downwardly and the conveyor 30 extends forwardly and downwardly from the forward end of the support arm 49 in the required angle as previously described.

In the retracted position shown in FIG. 4, the arm is pivoted in a counter clockwise direction so that the conveyor 30 is also pivoted in the counter clockwise direction and raised up closely under the frame and under the bracket 41.

A steering link 57 of fixed length is connected between the beams 36 at a clevis 58 and the lift arm 45 at a clevis 59 adjacent the lower end of the lift arm. This link is arranged so the geometry of the system causes the link to guide pivotal movement of the beam 36 around the pin 54 so as to pivot the end of the conveyor at the roller 31 forwardly to a greater extent than the opposite end of the conveyor as the whole of the conveyor is carried forwardly by the bracket 51.

A second steering link 60 is connected between the shield 42 and the bracket 41. The steering link 60 acts to fold the shield downwardly and forwardly as can be seen by comparing FIGS. 5 and 6.

The length and/or position of the steering links 57 and 60 can be adjusted so as to change the movement of the conveyor between the two separate positions shown in FIG. 1. The angle of the pin 54 to a vertical plane longitudinally of the tractor and thus the angle of the pivot axis 54A to the vertical can be adjusted, as best shown in FIG. 7, by releasing bolts 54B and twisting the second pivot portion 53 relative to the bracket portion 52 at the forward end of the arm 49. This change in angle of the axis 54A changes the inclination of the conveyor belt as it extends across the tractor thus raising or lowering the outer end of the conveyor at the first guide roller 32.

It will be appreciated that the mounting arrangement is only one example of a number of mounting arrangements which can provide the mechanical movement described above and that other arrangements will be apparent to one skilled in the art from analysis of the movements required.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A swather comprising:
   a tractor having a frame;
   ground wheels for supporting the frame for movement across the ground including two front ground wheels spaced apart to define an open width underneath the tractor and between the front wheels and two rear ground wheels spaced apart to define an open width underneath the tractor and between the rear wheels;
   a header for attachment across a front of the tractor for cutting a standing crop as the tractor moves over the ground;
   the header having a converging system for converging the cut crop inwardly from ends of the header toward a discharge at a central area of the header;

the discharge of the header being arranged between the front wheels such that crop discharged from the header passes through the open width between the front wheels to be discharged onto the ground in a swath as the tractor moves forwardly and the standing crop is cut;

and a swath conveyor located underneath the frame and arranged to receive cut crop from the discharge and for conveying the cut crop across the frame to a first discharge side of the frame for discharge to an associated first side of the tractor;

the swath conveyor comprising an endless belt mounted on guide rollers including a first guide roller on the first discharge side of the frame and a second guide roller on a second side of the frame opposite the first discharge side such that crop falling on an upper run of the belt is carried by that upper run transversely of the frame from a position rearward of the discharge toward the first guide roller to said discharge side of the frame;

a mounting assembly mounting the swath conveyor for movement relative to the frame between:

a raised storage position in which the upper run and the guide rollers therefor are generally horizontal underneath the frame;

and a lowered operating position in which the upper run of the belt is inclined by the first and second guide rollers from an upper/rear edge forwardly and downwardly to a lower/front edge such that the crop from the discharge lands on the upper run between the upper/rear edge and the lower/front edge to be carried transversely to said one side of the frame;

the mounting assembly being arranged such that, as the swath conveyer is moved by the mounting assembly from the raised position to the lowered position, the mounting assembly causes forward movement of the lower/front edge of the upper run at the second guide roller relative to the lower/front edge of the upper run at the first guide roller.

2. The tractor according to claim 1 wherein the mounting assembly is arranged such that both the lower/front edge of the upper run at the second guide roller and the lower/front edge of the upper run at the first guide roller are also both moved forwardly by the mounting assembly as the swath conveyer is moved from the raised position to the lowered position.

3. The tractor according to claim 1 wherein the mounting assembly is arranged such that the lower/front edge of the upper run at the second guide roller is moved by the mounting assembly such that the lower/front edge of the upper run at the second guide roller is in the lowered position located in a position between the front wheels.

4. The tractor according to claim 1 wherein the mounting assembly is adjustable such that the amount of forward movement of the lower/front edge of the upper run at the second guide roller relative to the lower/front edge of the upper run at the first guide roller is adjustable.

5. The tractor according to claim 1 wherein the mounting assembly is adjustable between two selectable arrangements such that the amount of forward movement of the lower/front edge of the upper run at the second guide roller relative to the lower/front edge of the upper run at the first guide roller is adjustable between two separate amounts.

6. The tractor according to claim 1 wherein the mounting assembly comprises a transverse rear beam carried on a linkage by which the beam is raised upwardly and rearwardly from the lowered position to the raised position while the beam is rotated about an axis longitudinal of the beam.

7. The tractor according to claim 6 wherein the linkage includes a lift arm mounted on the frame and a pivot coupling at a forward end of the lift arm allowing pivotal movement of the beam relative to the forward end of the lift arm to allow the forward movement of the lower/front edge of the upper run at the second guide roller.

8. The tractor according to claim 7 wherein there is provided a steering link connected to the beam for causing the pivotal movement of the beam.

9. A swather comprising:

a tractor having a frame;

ground wheels for supporting the frame for movement across the ground including two front ground wheels spaced apart to define an open width underneath the tractor and between the front wheels and two rear ground wheels spaced apart to define an open width underneath the tractor and between the rear wheels;

a header for attachment across a front of the tractor for cutting a standing crop as the tractor moves over the ground;

the header having a converging system for converging the cut crop inwardly from ends of the header toward a discharge at a central area of the header;

the discharge of the header being arranged between the front wheels such that crop discharged from the header passes through the open width between the front wheels to be discharged onto the ground in a swath as the tractor moves forwardly and the standing crop is cut;

and a swath conveyor located underneath the frame and arranged to receive cut crop from the discharge and for conveying the cut crop across the frame to a first discharge side of the frame for discharge to an associated first side of the tractor;

the swath conveyor comprising an endless belt mounted on guide rollers including a first guide roller on the first side of the frame and a second guide roller on a second side of the frame opposite the first side such that crop falling on an upper run of the belt is carried by that upper run transversely of the frame from a position rearward of the discharge toward the first guide roller to said one side of the frame;

a mounting assembly mounting the swath conveyor for movement relative to the frame between:

a raised storage position in which the upper run and the guide rollers therefor are generally horizontal underneath the frame;

and a lowered operating position in which the upper run of the belt is inclined by the first and second guide rollers from an upper/rear edge forwardly and downwardly to a lower/front edge such that the crop from the discharge lands on the upper run between the upper/rear edge and the lower/front edge to be carried transversely to said one side of the frame;

the mounting assembly being arranged such that, as the swath conveyer is moved by the mounting assembly from the raised position to the lowered position, the mounting assembly causes forward movement of both the lower/front edge of the upper run at the second guide roller and the lower/front edge of the upper run at the first guide roller.

10. The tractor according to claim 9 wherein the mounting assembly is arranged such that the lower/front edge of the upper run at the second guide roller is moved by the mounting assembly such that the lower/front edge of the upper run at the second guide roller is in the lowered position located in a position between the front wheels.

11. The tractor according to claim 9 wherein the mounting assembly is adjustable such that the amount of forward movement of the lower/front edge of the upper run at the second guide roller is relative to the lower/front edge of the upper run at the first guide roller adjustable.

12. The tractor according to claim 9 wherein the mounting assembly is adjustable between two selectable arrangements such that the amount of forward movement of the lower/front edge of the upper run at the second guide roller relative to the lower/front edge of the upper run at the first guide roller is adjustable between two separate amounts.

13. The tractor according to claim 9 wherein the mounting assembly comprises a transverse rear beam carried on a linkage by which the beam is raised upwardly and rearwardly from the lowered position to the raised position while the beam is rotated about an axis longitudinal of the beam.

14. The tractor according to claim 13 wherein the linkage includes a lift arm mounted on the frame and a pivot coupling at a forward end of the lift arm allowing pivotal movement of the beam relative to the forward end of the lift arm to allow the forward movement of the lower/front edge of the upper run at the second guide roller.

15. The tractor according to claim 14 wherein there is provided a steering link connected to the beam for causing the pivotal movement of the beam.

16. A swather comprising:
a tractor having a frame;
ground wheels for supporting the frame for movement across the ground including two front ground wheels spaced apart to define an open width underneath the tractor and between the front wheels and two rear ground wheels spaced apart to define an open width underneath the tractor and between the rear wheels;
a header for attachment across a front of the tractor for cutting a standing crop as the tractor moves over the ground;
the header having a converging system for converging the cut crop inwardly from ends of the header toward a discharge at a central area of the header;
the discharge of the header being arranged between the front wheels such that crop discharged from the header passes through the open width between the front wheels to be discharged onto the ground in a swath as the tractor moves forwardly and the standing crop is cut;
and a swath conveyor located underneath the frame and arranged to receive cut crop from the discharge and for conveying the cut crop across the frame to a first discharge side of the frame for discharge to an associated first side of the tractor;
the swath conveyor comprising an endless belt mounted on guide rollers including a first guide roller on the first side of the frame and a second guide roller on a second side of the frame opposite the first side such that crop falling on an upper run of the belt is carried by that upper run transversely of the frame from a position rearward of the discharge toward the first guide roller to said one side of the frame;
a mounting assembly mounting the swath conveyor for movement relative to the frame between:
a raised storage position in which the upper run and the guide rollers therefor are generally horizontal underneath the frame;
and a lowered operating position in which the upper run of the belt is inclined by the first and second guide rollers from an upper/rear edge forwardly and downwardly to a lower/front edge such that the crop from the discharge lands on the upper run between the upper/rear edge and the lower/front edge to be carried transversely to said one side of the frame;
wherein the mounting assembly comprises a transverse rear beam carried on a linkage by which the beam is raised upwardly and rearwardly from the lowered position to the raised position while the beam is rotated about an axis longitudinal of the beam;
and wherein the linkage includes a lift arm mounted on the frame and a pivot coupling at a forward end of the lift arm allowing pivotal movement of the beam relative to the forward end of the lift arm to allow the forward movement of the lower/front edge of the upper run at the second guide roller.

17. The tractor according to claim 16 wherein there is provided a steering link connected to the beam for causing the pivotal movement of the beam.

* * * * *